(12) United States Patent
Nagashima et al.

(10) Patent No.: US 6,617,812 B2
(45) Date of Patent: Sep. 9, 2003

(54) ELECTRICALLY MOVING APPARATUS FOR MOVING A MOVABLE MEMBER

(75) Inventors: Youji Nagashima, Toyota (JP); Takashi Kitani, Kariya (JP); Tsutomu Tanoi, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/083,573

(22) Filed: Feb. 27, 2002

(65) Prior Publication Data

US 2002/0117983 A1 Aug. 29, 2002

(30) Foreign Application Priority Data

Feb. 27, 2001 (JP) .......................................... 2001-052998

(51) Int. Cl.[7] .................................................. H02P 1/00
(52) U.S. Cl. ........................ 318/280; 318/282; 318/445; 318/465; 318/434
(58) Field of Search ................................ 318/280, 282, 318/445, 465, 458, 477, 434

(56) References Cited

U.S. PATENT DOCUMENTS 6,505,127 B1 * 1/2003 Togami ........................ 702/33

FOREIGN PATENT DOCUMENTS

JP 61-69391 4/1986

* cited by examiner

*Primary Examiner*—Karen Masih
(74) *Attorney, Agent, or Firm*—Finnegan, Henderson, Farabow, Garrett & Dunner, L.L.P.

(57) ABSTRACT

An electrically moving apparatus for moving a movable body includes a security mechanism for detecting an abnormal increase of a load applied to the movable body during the movable body being moved by an operation of an electric motor. The electrically moving apparatus does not require an increase of a threshold value for judging the increase of the load applied to the movable body. The security mechanism is not operated when an increase of a load for lifting down an operative member being movable in response to the movement of the movable body.

13 Claims, 4 Drawing Sheets

ELECTRICALLY MOVING APPARATUS FOR MOVING A MOVABLE MEMBER

CROSS REFERENCE TO RELATED APPLICATIONS

This application is based on and claims priority under 35 U.S.C. § 119 with respect to a Japanese Patent Application 2001-052998, filed on Feb. 27, 2001, the entire content of which is incorporated herein by reference.

FIELD OF THE INVENTION

This invention generally relates to an electrically moving apparatus provided with a safety mechanism for stopping a moving operation of a movable body or reversing a moving direction thereof when a load applied to the movable body is increased and surpasses a reference value over a predetermined threshold value. More particularly, this invention pertains to an electrically moving apparatus applicable for a vehicle sun roof apparatus provided with a sliding panel operated by an electric motor for opening and closing an opening defined in a vehicle roof.

BACKGROUND OF THE INVENTION

There have been widely known various electrically moving apparatus provided with a safety mechanism and being applicable for a vehicle window, a vehicle sun roof and the like. Referring to an electrically moving apparatus disclosed in a Japanese Patent Laid-open Publication 61 (1986)-69391, the electrically moving apparatus is provided for a power window or a vehicle sun roof apparatus and is employed for stopping a moving operation of a window glass or a sliding panel or for reversing a moving direction thereof in an opening direction when a load for closing them is detected to be abnormally increased due to entrapments of foreign objects such as a hand. Therefore, the window glass or the sliding panel can be operated by the electrically moving apparatus provided with the safety mechanism not to apply overload to the entrapped foreign object.

A common sun roof apparatus is generally provided with a deflector at a front edge portion of an opening defined in a vehicle roof so as to prevent wind from being involved into a vehicle interior during the vehicle running. The deflector is lifted down to be set at an inoperative position when the sliding panel is moved in a vehicle forward direction for closing the opening. On the other hand, the deflector is lifted up by means of a return spring to be set at an operative position when the opening is opened again. When the above described electrically moving apparatus with the safety mechanism is applied for the sun roof apparatus, changes of the load applied to the sliding panel can be detected by revolution changes of an electric motor. A predetermined threshold value has been predetermined to judge a decreasing revolution of the electric motor for distinguishing the increasing load due to an entrapment from the other increasing load for lifting the deflector down to set at the inoperative position against an operational force of the return spring. The threshold value is preset not to operate the safety mechanism only in response to a decreasing amount of the electric motor revolution generated by the increase of the load for setting the deflector at the inoperative position.

However, according to the electrically moving apparatus disclosed in the above publication, the deflector for preventing wind from being involved into a vehicle interior may be sized-up to achieve the sun roof apparatus with a large opening area for an occupant to feel more comfortable in the vehicle. In this case, the operational force of the return spring is required to be increased for stably supporting the deflector at the operative position against wind pressure, vehicle vibration and the like. In this case, the threshold value to judge the decreasing amount of the electric motor revolution is required to be large not for operating the safety mechanism by recognizing the lift down of the deflector as the entrapment by mistake. That is, the threshold value is required to be set corresponding to large load. In this case, the load to detect the entrapment is hence increased. This may lead to lower a security of the electrically moving apparatus accommodated for the sun roof apparatus. However, when the security of the electrically moving apparatus for the sun roof apparatus is required to be improved, the spring with a sufficiently large operational force for supporting the deflector at the operative position may not be able to be employed.

Accordingly, the disclosed electrically moving apparatus is still susceptible of certain improvements with respect to being applicable for the sun roof apparatus having the spring for stably supporting the deflector at the operative position without increasing the threshold value.

SUMMARY OF THE INVENTION

It is an object of the present invention that an electrically moving apparatus for moving a movable body is provided with a safety mechanism for accurately preventing entrapment by operating the movable body with a small load of an electric motor and is provided with a return spring with a sufficiently large operating force.

In order to achieve the objective, there is provided an improved electrically moving apparatus for moving the movable body comprising an electric motor for moving the movable body, an operative member operatively connected to the movable body and operated in response to the movement of the movable body. The electrically moving apparatus for moving the movable body further comprises a control device. The control device stops the movement of the movable body or reverses a moving direction thereof when a load applied to the movable body is increased from a reference value over a predetermined threshold value during the movement of the moveable body. The control device further updates the reference value, wherein a load of the electric motor is temporarily decreased during the operation of the operative member.

Preferably, the control device preferably includes a means for temporarily decreasing the load of the electric motor during the operation of the operative member including a sliding surface provided on an upper portion of the operative member, a recessed portion defined on the sliding surface, and a contact member moved in response to the movement of the movable body so as to become in contact with the recessed portion for temporarily decreasing the load of the electric motor during the operation of the operative member.

Further, the control device preferably includes a means for temporarily decreasing the load of the electric motor during the operation of the operative member including a contact portion provided on a lower portion of the operative member, a recessed portion defined on the contact portion, and a biasing means for biasing the operative member in an upper direction for temporarily decreasing the load of the electric motor during the operation of the operative member.

The electrically moving apparatus for moving the movable body preferably comprises a means for detecting a decrease or an increase of a revolution of the electric motor and a means for detecting an increase or a decrease of the load applied to the movable body based upon the decrease or the increase of the revolution of the electric motor detected by the means for detecting the decrease or the increase of the revolution of the electric motor, wherein the reference value is updated when the load applied to the movable body is decreased.

Preferably, the electrically moving apparatus with the above described structure is applied to a sun roof apparatus including an opening defined in a vehicle roof. The sun roof apparatus provided with the electrically moving apparatus includes a sliding panel movably connected to the vehicle roof and movable in a vehicle longitudinal direction for closing and opening the opening by an operation of an electric motor, a deflector operatively connected to the sliding panel and operated to be tilted up and down in response to the movement of the sliding panel, and a control device for stopping the movement of the sliding panel or reversing a moving direction thereof when a load applied to the sliding panel is increased from a reference value over a predetermined threshold value during the movement of the sliding panel and for updating the reference value, wherein a load of the electric motor is temporarily decreased during the operation of the deflector.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
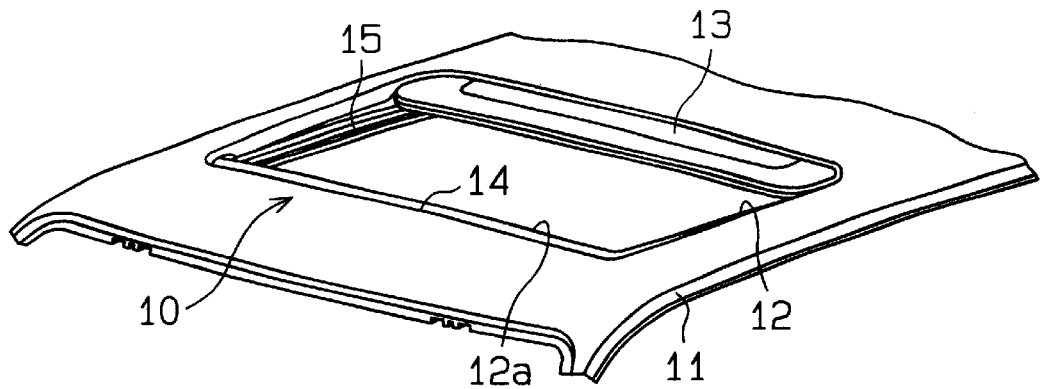
FIG. 1 is a perspective view illustrating a vehicle roof provided with a sun roof apparatus according to the present invention.
Figure 2:
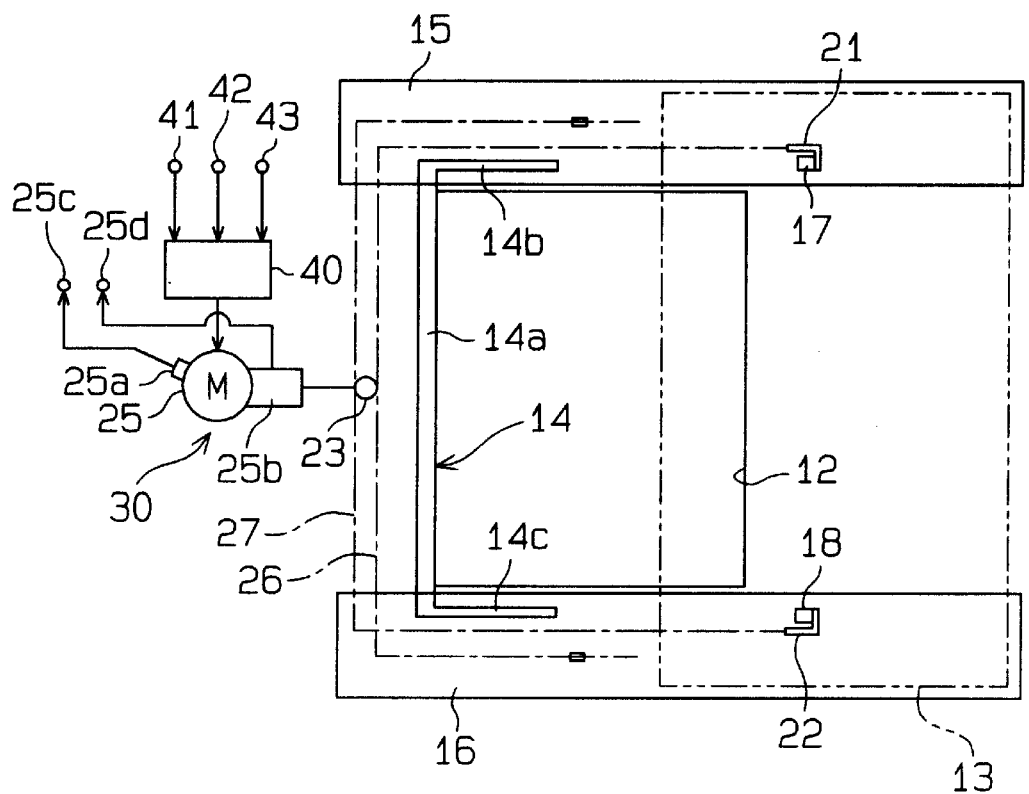
FIG. 2 is a plan bock view schematically illustrating the sun roof apparatus according to the present invention.

Referring to FIG. 1, a sun roof apparatus 10 mounted on a vehicle roof 11 is provided with an opening 12 defined in the vehicle roof 11, a sliding panel 13 movably connected to the opening 12, and a deflector 14 disposed at a front edge portion 12a of the opening 12. The sliding panel 13 is slidably moved in a vehicle longitudinal direction for closing and opening the opening 12. As illustrated in FIG. 2, a pair of shoes 17, 18 is fixed to right and left sides of the sliding panel 13, respectively. Guide rails 15, 16 are fixed to right and left sides of the opening 12. The shoes 17, 18 are slidably engaged to the guide rails 15, 16 and are movable in the vehicle longitudinal direction. Therefore, the sliding panel 13 can be slidably moved in the vehicle longitudinal direction for closing and opening the opening 12. The shoes 17, 18 are further fixed to connecting members 21, 22 operatively fixed to cables 26, 27, respectively.

Figure 3:
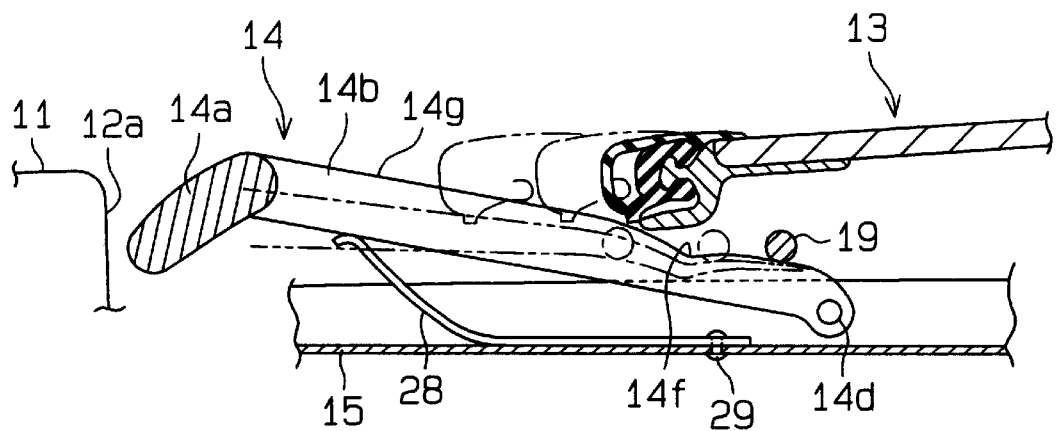
FIG. 3 is an enlarged side view illustrating a deflector set at an operative position according to a first embodiment of the present invention.
Figure 4:
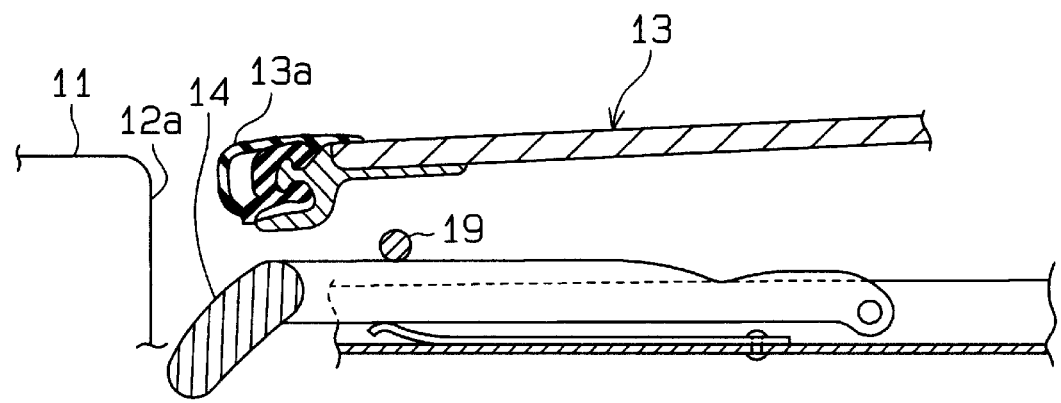
FIG. 4 is an enlarged side view illustrating the deflector set at an inoperative position according to the first embodiment of the present invention.

As illustrated in FIGS. 1 and 2, the deflector 14 is formed of a wind deflecting portion 14a extending in a vehicle lateral direction along the front edge portion 12a and arm portions 14b, 14c extending from both ends of the wind deflecting portion 14a in a vehicle rearward direction. As illustrated in FIG. 3, the arm portions 14b, 14c are freely rotatably connected to the guide rails 15, 16 at pivots 14d, respectively. Each pivot 14d is provided at each rear end of each arm portion 14b, 14c. FIGS. 3 and 4 show an only vehicle right side with the arm portion 14b and the pivot 14d. Therefore, the other pivot 14d of the arm portion 14c is not illustrated in FIGS. 3 and 4. A pair of leaf springs 28 are provided under the arm portions 14b, 14c, respectively. One end of each leaf spring 28 is in contact with each arm portion 14b, 14c and the other end thereof is connected to each guide rail 15, 16 by means of a rivet 29. FIGS. 3 and 4 show the only vehicle right side with the leaf spring 28 of the arm portion 14b. Therefore, the other leaf spring 28 of the arm portion 14c is not illustrated in FIGS. 3 and 4. The pair of leaf springs 28 is employed for lifting up the wind deflecting portion 14a. The deflector 14 illustrated in FIG. 3 is set at an operative position with the wind deflecting portion 14a lifted to an upper limit position in response to the rearward movement of the sliding panel 13 for opening the opening 12. The arm portions 14b, 14c at the operative position are prevented from being rotated in a clockwise direction by a not-shown stopper and maintained at the operative position illustrated in FIG. 3. Operational force of the pair of leaf springs 28 is preset to be sufficiently large to maintain the deflector 14 at the operative position illustrated in FIG. 3 even when wind pressure or vehicle vibration is applied to the deflector 14 during the vehicle being running.

On the other hand, FIG. 4 shows the deflector 14 set at an inoperative position with the wind deflecting portion 14a lifted down to a lower limit position. In this case, the opening 12 is closed by the sliding panel 13. A pin 19 is fixed to a supporting mechanism (not shown) guided by the guide rails 15 and 16 for supporting a front end of the sliding panel 13. The deflector 14 is operated to be set at the inoperative position in response to the pin 19 moved in the vehicle forward direction being pushed upon each upper surface of each arm portion 14b, 14c. The forward movement of the pin 19 is operatively associated with the forward movement of the sliding panel 13.

Next, a driving device 30 of the sliding panel 13 is described with reference to FIG. 2. The driving device 30 is provided with an electric motor 25, a speed reduction gear 25b, a gear 23, and the cables 26, 27. Each cable 26 and 27 is a toothed cable employed by a driving device for a known sun roof apparatus. Both cables 26 and 27 are structured to be engaged with the gear 23. The shoe 17 for the cable 26 and the shoe 18 for the cable 27 are respectively moved in the vehicle longitudinal direction in response to a rotational direction of the gear 23. Therefore, the sliding panel 13 integrally provided with the shoes 17, 18 is operated for closing and opening the opening 12.

The gear 23 is operated by the electric motor 25 via the speed reduction gear 25b. A control device 40 is connected to the electric motor 25 for performing control starting and stopping of the electric motor 25 and for performing control of a rotational direction thereof. The electric device 40 is provided with terminals 41, 42, and 43. The terminal 41 receives signals from a switch (not shown) for operating the sun roof apparatus 10. The terminal 42 is connected to a revolution signal terminal 25c of a rotational sensor 25a provided in the electric motor 25. The rotational sensor 25a outputs signals in response to the revolution of the electric motor 25. The terminal 43 is connected to a position signal terminal 25d provided in the speed reduction gear 25b. The position signal terminal 25d outputs a position signal of the sliding panel 13 by means of a switch and the like.

Hereinafter, a safety mechanism for preventing entrapments according to the present invention is described below. The safety mechanism is operated by a control device 40 provided with a micro processing unit for supplying electric current to the electric motor 25 in response to the inputs from each terminal to the control device 40.

Generally, an electric motor operated by DC electric current is characterized in that the electric current supplied to the electric motor is increased and a revolution (N) thereof is decreased in response to an increase of a rotational load thereof. Taking advantages of the above described characteristics of the electric motor, the safety mechanism for preventing entrapments according to the present invention detects a change of the revolution (N) of the electric motor 25 based upon the signal from the rotational sensor 25a and further detects an increase of a load applied to the sliding panel 13 being operated to close the opening 12. When the load applied to the sliding panel 13 is detected to be abnormally increased due to entrapping foreign objects such as a hand between the sliding panel 13 and the opening 12, the forward movement of the sliding panel 13 is stopped or the sliding panel 13 is moved in the vehicle rearward direction. Therefore, an excessive load can be prevented from being applied to the entrapped object.

Figure 5:
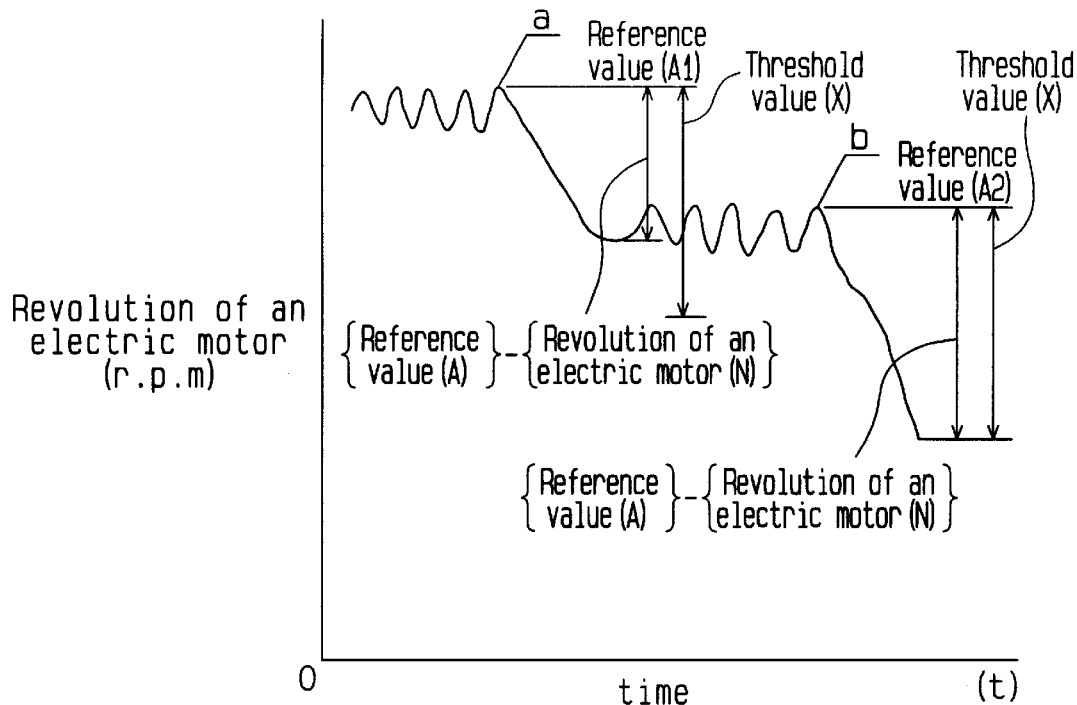
FIG. 5 is a graph showing a revolution (N) of an electric motor over a lapse of time (t) for describing an operation of a safety mechanism for preventing an entrapment according to the present invention.

Next, a method for detecting entrapments between the sliding panel 13 and the opening 12 is described based upon the revolution (N) of the electric motor 25. Referring to FIG. 5, the revolution (N) of the electric motor 25 is shown over a lapse of time (t) during the movement of the sliding panel 13 in the vehicle forward direction. Even when the sliding panel 13 is normally operated to close the opening 12, the load applied to the electric motor 25 is fluctuated due to vehicle vibration during the vehicle being running or due to friction of each vehicle component. Therefore, the revolution (N) of the electric motor 25 is fluctuated in response to the fluctuation of the load applied to the electric motor 25. A threshold value (X) and a reference value (A) are preset for detecting the entrapment. The threshold value (X) is a predetermined value. The reference value (A) is maintained at an actual value when the revolution (N) is decreased. On the other hand, the reference value (A) is updated for being set at a maximum value at the time every time when the revolution (N) is increased. The sliding panel 13 is judged to be under a normal condition to close the opening 12 while a decreasing amount of the revolution (N) from the reference value (A) is below the threshold value (X). For example, referring to FIG. 5, the reference value (A) is updated to be set at a maximum value (A1) of the revolution (N) at a point (a). Although the revolution (N) of the electric motor 25 is decreased after the point (a), the decreasing amount of the revolution (N) does not reach the threshold value (X). Therefore, the sliding panel 13 is judged to be normally operated to close the opening 12. The revolution (N) is then increased several times and the reference value (A) is updated to be set at a maximum value at each time that the revolution (N) is increased. The reference value (A) is then updated to be set at a maximum value (A2) at a point (b). The decreasing amount of the revolution (N) from the maximum value (A2) after the point (b) reaches the threshold value (X). Therefore, the sliding panel 13 is judged to be under an abnormal condition to close the opening 12 due to the entrapment. Therefore, the electric motor 25 is judged to have been applied with an abnormal load in which the operation of the electric motor 25 is stopped or the rotational direction thereof is reversed.

Driving force of the electrically moving apparatus provided with various components such as a sun roof apparatus may be fluctuated due to friction resistance among the components and the like. Therefore, the above described safety mechanism operated based upon an increasing amount of the load of the electric motor 25 is effectively employed for minimizing the fluctuation of the driving force and for accurately detecting an only increase of a driving force due to the entrapment.

Figure 6:
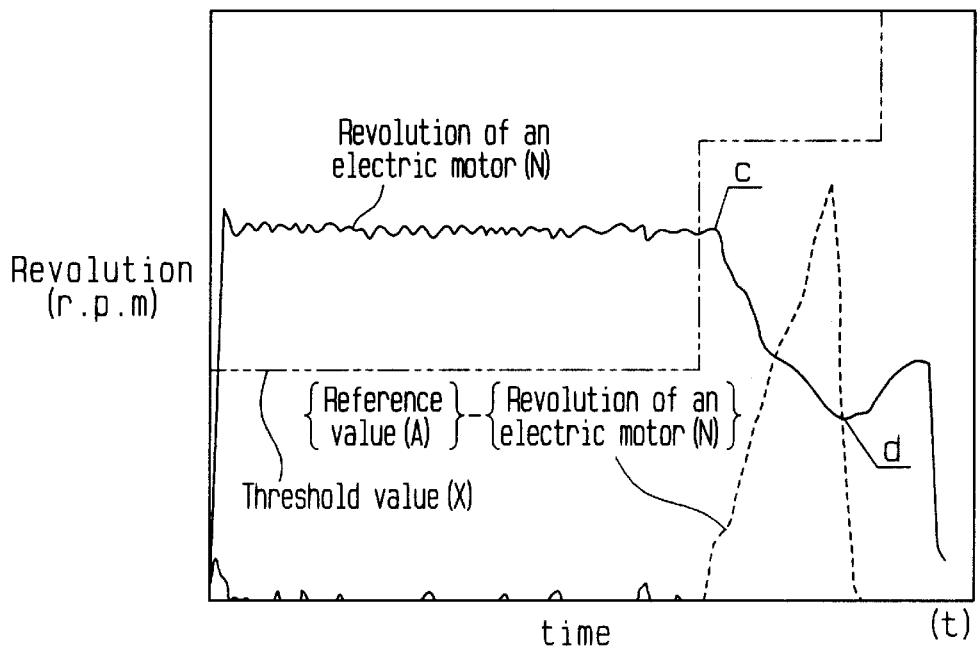
FIG. 6 is a graph showing a revolution (N) of an electric motor, a decreasing amount of the revolution (N), and a threshold value (X) employed by a conventional sun roof apparatus.

Next, the above described driving device 30 applied for the sun roof apparatus 10 according to the present invention is described below. Referring to a graph of a conventional sun roof apparatus illustrated in FIG. 6, identical elements of the conventional sun roof apparatus is denoted by identical reference numerals to those of the sun roof apparatus 10 of the present invention. The graph illustrated in FIG. 6 shows characteristics of the sun roof apparatus 10 under the normal condition without entrapments. The characteristics are shown based upon a vertical axis representing the revolution (N) of the electric motor 25 and a horizontal axis representing a time lapse (t) from a state where the sliding panel 13 is entirely open to the other state where the sliding panel 13 is entirely closed. As illustrated in FIG. 3, while the sliding panel 13 is moved in the forward direction from an entirely opening condition, the pin 19 fixed to the supporting mechanism (not shown) of the sliding panel 13 is moved onto each upper surface portion of each arm portion 14b, 14c at a point (c) in FIG. 6. The revolution (N) of the electric motor 25 is maintained at a substantially fixed value until the point (c). After the point (c), the sliding panel 13 is moved in the vehicle forward direction. Corresponding to the forward movement of the sliding panel 13, the pin 19 moved onto each arm portion 14b, 14c is further moved in the vehicle forward direction to lift down the deflector 14 in a direction of the inoperative position against the operational force of the pair of leaf springs 28. Therefore, the load applied to the electric motor 25 is increased in response to an increase of the operational force of the pair of leaf springs 28 so that the revolution (N) of the electric motor 25 is decreased. As illustrated in FIG. 4, when the sliding panel 13 is almost entirely closing the opening 12, the arm portions 14b, 14c becomes substantially horizontal and the deflector 14 is then set at the inoperative position at a point (d) in FIG. 6. The increase of the operational force of the pair of leaf springs 28 is not generated any more and the revolution (N) is slightly increased. The opening 12 is entirely closed with a weather trip 13a assembled at a front end of the sliding panel 13 being in contact with the front edge portion 12a of the opening 12. Therefore, the operation of the electric motor 25 is terminated.

According to the conventional sun roof apparatus, a method for setting the threshold value (X) shown in FIG. 6 has been employed. While the sliding panel 13 is operated to close the opening 12 from the point (c) to the point (d), the revolution (N) is consequently decreased and the decreasing amount is large. The reference value (A) updated at the point (c) is not updated any more within a range between the point (c) and the point (d). If the decreasing amount of the revolution (N) becomes above the threshold value (X) within the range. In this case, the safety mechanism for preventing the entrapment may be operated so that the sliding panel 13 cannot be closed. Therefore, to avoid the above-described drawbacks, the threshold value (X) after the point (c) has been set to be larger than the one before the point (c).

However, as illustrated in FIG. 3, a space to entrap foreign objects such as a hand is still remained in the opening 12 when the sliding panel 13 is positioned from a position corresponding to the point (c) to the other position corresponding to the point (d). As shown in FIG. 6, the threshold value (X) between these two points (c), (d) has been set at a large value. Therefore, the closing operation of the sliding panel 13 may not be terminated or the moving direction of the sliding panel 13 is not reversed until the revolution (N) of the electric motor 25 is largely decreased. That is, excessive load may be applied to the entrapped object. In other words, the threshold value (X) to be employed can not be set at a large value as described above and is required to be limited for assuring safety with the sun roof apparatus 10.

To overcome the above described drawbacks, according to the present invention, the reference value (A) is updated during a process corresponding to the range between the two points (c), (d) and the threshold value (X) is maintained at a small value. Therefore, the decreasing amount of the revolution (N) is set not to exceed the threshold value (X).

Figure 7:
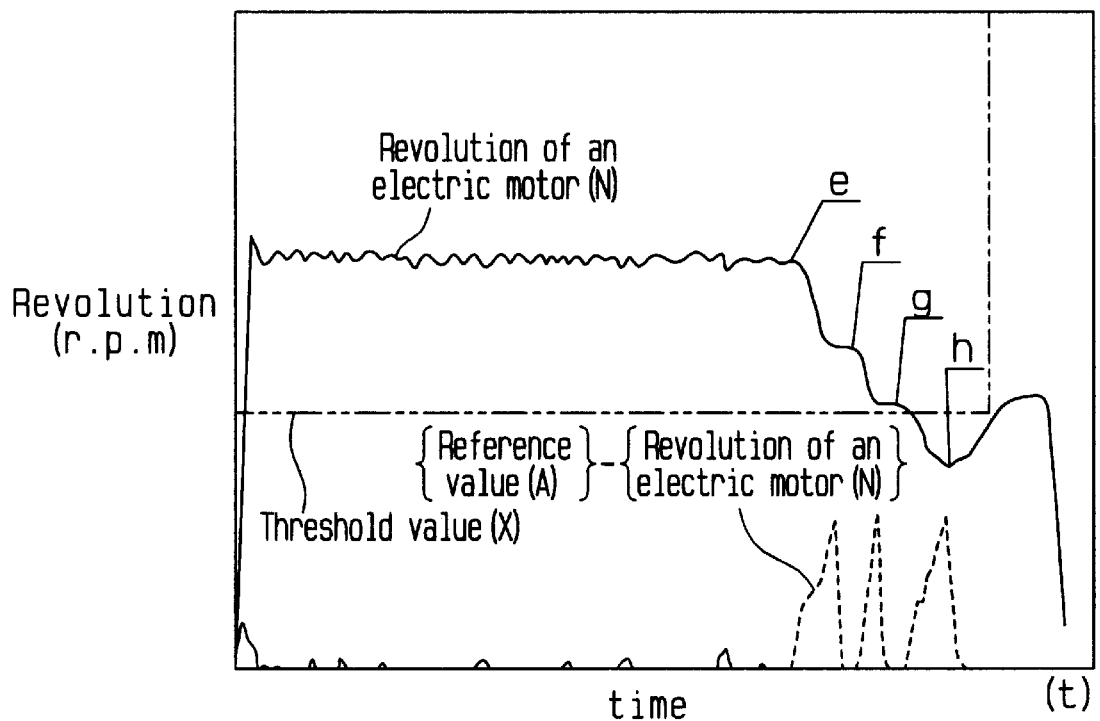
FIG. 7 is a graph showing a revolution (N) of the electric motor, a decreasing amount of the revolution (N) and a threshold value (X) employed by the sun roof apparatus according to the present invention.

According to a first embodiment of the present invention, as illustrated in FIG. 3, each arm portion 14b, 14c is provided with a recessed portion 14f at a sliding surface 14g of each arm portion 14b, 14c. The sliding surface 14g of the arm portions 14b, 14c becomes in contact with the pin 19. When the pin 19 is reached the recessed portion 14f, the operational force of the pair of leaf springs 28 is decreased for a short period of time and the revolution (N) of the electric motor 25 is hence increased. FIG. 7 shows the characteristics of the revolution (N) according to the sun roof apparatus 10 provided with this structure. Referring to FIG. 7, the reference value (A) is updated to be set at a maximum value at a point (f) in which the pin 19 is reached the recessed portion 14f. As one of modifications of the sun roof apparatus 10 of the present invention, the other recessed portion being similar to the recessed portion 14f can be provided with each arm portion 14b, 14c for updating the reference value (A) to be set at a maximum value at a point (g). The reference value (A) can be updated to be set at each maximum value at the points (f), (g). Therefore, the decreasing amount of the revolution (N) from the reference value (A) can be decreased.

Therefore, as illustrated in FIG. 7, the load for lifting down the deflector 14 is prevented from being recognized as the load due to the entrapment by mistake without setting the threshold value (X) at a large value. That is, even when foreign objects is entrapped while the deflector 14 has been lifted down for closing the opening 12, the entrapment can be detected at a small load since the threshold value (X) has been set at a small value. Therefore, the safety mechanism can be effectively performed. Further, the number of the recessed portions can be increased for updating the reference value (A) more minutely.

Figure 8:
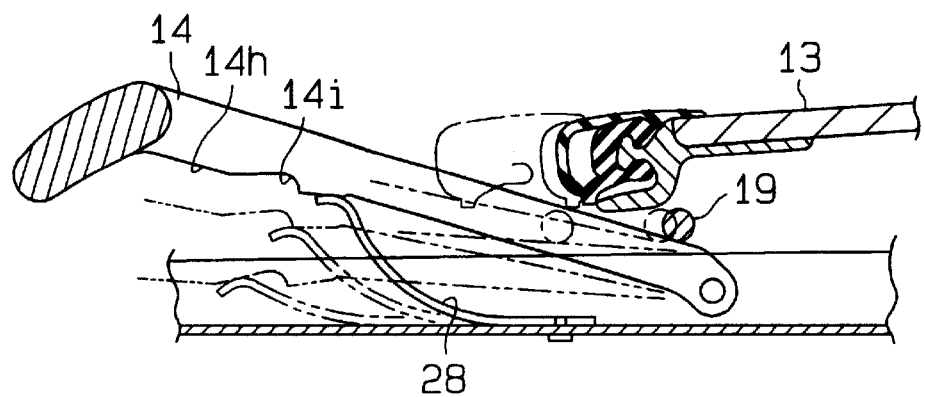
FIG. 8 is an enlarged side view illustrating the deflector of the sun roof apparatus according to a second embodiment of the present invention.

Referring to a second embodiment of the present invention illustrated in FIG. 8, a recessed portion 14i can be provided at a contact portion 14h of a lower surface of each arm portion 14b, 14c. Each contact portion 14h becomes in contact with each of the pair of leaf springs 28. Therefore, the reference value (A) can be updated while the deflector 14 has been lifted down to be set at the inoperative position.

As described above, the present invention can be performed without being limited only to the structure provided with the recessed portion 14f or 14i as far as the load to lift down the deflector 14 can be decreased temporarily while the deflector 14 has been lifted down.

The closing and opening operations of the sun roof apparatus 10 according to the present invention is performed by operating the switch (not shown) by an occupant in the same manner as the known sun roof apparatus. The safety mechanism can be performed when the foreign objects such as a hand is entrapped during the sliding panel 13 being operated for closing the opening 12 so as not to apply excessive load to the entrapped object.

As described above, the sun roof apparatus 10 provided with the electrically moving apparatus with the above described structure can operate the safety mechanism for preventing entrapment with a sufficiently small load. Further, the sun roof apparatus 10 of the present invention can employ the leaf springs 28 with a sufficiently large operational force so as to maintain the deflector 14 at the operative position.

Further, the threshold value (X) is not required to be set at a large value even while the deflector 14 has been tilted down to be set at the inoperative position. According to the known sun roof apparatus with the electrically moving apparatus, a state where the deflector 14 has been tilted down to be set at the inoperative position has been distinguished from a last state where the deflector 14 has been set at the operative position based upon a signal representing the position of the sliding panel 13 outputted from a switch disposed in the speed reduction gear 25b. However, according to the sun roof apparatus 10 of the present invention, the state where the deflector 14 has been tilted down to be set at the inoperative position is not required to be distinguished from the last state where the deflector 14 has been set at the operative position. Therefore, the switch for detecting the position of the sliding panel 13 can be simplified.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An electrically moving apparatus for moving a movable body comprising:
    an electric motor for moving the movable body;
    an operative member operatively connected to the movable body and operated in response to the movement of the movable body; and
    a control device for stopping the movement of the movable body or reversing a moving direction thereof when a load applied to the movable body is increased from a reference value over a predetermined threshold value during the movement of the moveable body and for updating the reference value, wherein a load of the electric motor is temporarily decreased during the operation of the operative member.

2. An electrically moving apparatus for moving a movable body, according to claim 1, wherein the control device includes a means for temporarily decreasing the load of the electric motor during the operation of the operative member including;
a sliding surface provided on an upper portion of the operative member;
a recessed portion defined on the sliding surface; and
a contact member moved in response to the movement of the movable body so as to become in contact with the recessed portion for temporarily decreasing the load of the electric motor during the operation of the operative member.

3. An electrically moving apparatus for moving a movable body, according to claim 1, wherein the control device includes a means for temporarily decreasing the load of the electric motor during the operation of the operative member including;
a contact portion provided on a lower portion of the operative member;
a recessed portion defined on the contact portion; and
a biasing means for biasing the operative member in an upper direction for temporarily decreasing the load of the electric motor during the operation of the operative member.

4. An electrically moving apparatus for moving a movable body, according to claim 1, 2, or 3, comprising:
a means for detecting a decrease or an increase of a revolution of the electric motor.

5. An electrically moving apparatus for moving a movable body, according to claim 4, comprising:
a means for detecting an increase or a decrease of the load applied to the movable body based upon the decrease or the increase of the revolution of the electric motor detected by the means for detecting the decrease or the increase of the revolution of the electric motor, wherein the reference value is updated when the load applied to the movable body is decreased.

6. An electrically moving apparatus for moving a sun roof apparatus including an opening defined in a vehicle roof, comprising:
a sliding panel movably connected to the vehicle roof and movable in a vehicle longitudinal direction for closing and opening the opening by an operation of an electric motor;
a deflector operatively connected to the sliding panel and operated to be tilted up and down in response to the movement of the sliding panel,
a control device for stopping the movement of the sliding panel or reversing a moving direction thereof when a load applied to the sliding panel is increased from a reference value over a predetermined threshold value during the movement of the sliding panel and for updating the reference value, wherein a load of the electric motor is temporarily decreased during the operation of the deflector.

7. An electrically moving apparatus for moving a sun roof apparatus provided with, according to claim 6, further comprising:
a driving means for driving the sliding panel including;
a cable means operatively fixed to a shoe;
a rotationally engaging means rotated by the electric motor in response to a rotational direction of the electric motor;
the rotationally engaging means for engaging the cable means for moving the cable means in response to a rotational direction of the rotationally engaging means so as to operate the sliding panel for closing and opening the opening.

8. An electrically moving apparatus for moving a sun roof apparatus, according to claim 7, further comprising:
the control device connected to the electric motor for controlling starting and stopping of the operation of the electric motor and for controlling the rotational direction of the electric motor including;
an operating means for closing and opening the opening by operating the sliding panel based upon an occupant's manual operation
a rotational speed sensor for detecting a revolution of the electric motor; and
a position sensor for detecting a position of the sliding panel.

9. An electrically moving apparatus for moving a sun roof apparatus, according to claim 8, wherein the control device stops the movement of the sliding panel or reverses the moving direction thereof when the load applied to the sliding panel is increased from the reference value over the predetermined threshold value during the sliding panel being moved and updates the reference value based upon signals from the operating means, the rotational speed sensor, and the position sensor, wherein the load of the electric motor is temporarily decreased while the deflector has been operated to be moved.

10. An electrically moving apparatus for moving a sun roof apparatus, according to claim 9, wherein the control device includes a means for temporarily decreasing the load of the electric motor during the operation of the deflector including;
a sliding surface provided on an upper portion of the deflector;
a recessed portion defined on the sliding surface; and
a pin moved in response to the movement of the sliding panel so as to become in contact with the recessed portion for temporarily decreasing the load of the electric motor during the operation of the deflector.

11. An electrically moving apparatus for moving a sun roof apparatus, according to claim 9, wherein the control device includes a means for temporarily decreasing the load of the electric motor during the operation of the operative member including;
a contact portion provided on a lower portion of the deflector;
a recessed portion defined on the contact portion; and
a biasing means for biasing the deflector in an upper direction for temporarily decreasing the load of the electric motor during the operation of the deflector.

12. An electrically moving apparatus for moving a sun roof apparatus, according to claim 10 or 11, comprising:
a means for detecting a decrease or an increase of a revolution of the electric motor.

13. An electrically moving apparatus for moving a sun roof apparatus, according to claim 12, comprising:
a means for detecting an increase or a decrease of the load applied to the sliding panel based upon the decrease or the increase of the revolution of the electric motor detected by the means for detecting the decrease or the increase of the revolution of the electric motor, wherein the reference value is updated when the load applied to the sliding panel is decreased.

* * * * *